(12) United States Patent
Maurais

(10) Patent No.: US 8,297,445 B2
(45) Date of Patent: Oct. 30, 2012

(54) SCREEN BASKET

(75) Inventor: Guy Maurais, Laval (CA)

(73) Assignee: Filtration Fibrewall Inc., Bois-des-Filion, Quebec (CA)

( * ) Notice: Subject to any disclaimer, the term of this patent is extended or adjusted under 35 U.S.C. 154(b) by 191 days.

(21) Appl. No.: 12/734,628

(22) PCT Filed: Oct. 24, 2008

(86) PCT No.: PCT/CA2008/001882
§ 371 (c)(1),
(2), (4) Date: May 13, 2010

(87) PCT Pub. No.: WO2009/062287
PCT Pub. Date: May 22, 2009

(65) Prior Publication Data
US 2010/0263819 A1      Oct. 21, 2010

Related U.S. Application Data

(60) Provisional application No. 60/987,818, filed on Nov. 14, 2007.

(51) Int. Cl.
*B07B 1/20* (2006.01)
(52) U.S. Cl. .................. 209/305; 209/273; 210/413
(58) Field of Classification Search .............. 209/273, 209/283, 305, 306; 210/413–415, 498, 512.1
See application file for complete search history.

(56) References Cited

U.S. PATENT DOCUMENTS

| 689,934 | A | 12/1901 | Vrooman et al. | |
|---|---|---|---|---|
| 703,682 | A | 7/1902 | Vrooman et al. | |
| 2,065,263 | A | 12/1936 | Beldam | |
| 3,220,340 | A | 11/1965 | Frykhult | |
| 3,515,281 | A | 6/1970 | Vore et al. | |
| 3,837,499 | A | 9/1974 | Luthi | |
| 3,941,703 | A | 3/1976 | Binard | |
| 3,962,091 | A | 6/1976 | Doria et al. | |
| 4,002,540 | A | 1/1977 | Bixby | |
| 4,410,424 | A | 10/1983 | Chupka et al. | |
| 4,818,403 | A | 4/1989 | Nagaoka | |
| 4,822,488 | A | 4/1989 | Shatuck | |
| 4,828,689 | A | 5/1989 | Lamort | |
| 5,061,370 | A | 10/1991 | Ferland et al. | 210/194 |
| 5,071,543 | A | 12/1991 | Rajala | 209/273 |
| 5,090,721 | A | 2/1992 | Lange | 220/485 |

(Continued)

FOREIGN PATENT DOCUMENTS

CA     2072776 A1     1/1993

(Continued)

OTHER PUBLICATIONS

Japanese Office Action issued Jul. 31, 2012 for Japanese Application No. 2010-533393 filed Jul. 27, 2010.

*Primary Examiner* — Joseph C Rodriguez
(74) *Attorney, Agent, or Firm* — Wegman, Hessler & Vanderburg

(57) ABSTRACT

A screen basket with replaceable profiled bars is described herein. The screen basket includes profiled bars evenly spaced circumferentially to form a plurality of continuous slots that covers the whole basket length. The profiled bars are fixed in place by a backing structure, including support rings. The support rings are made of at least two sections.

6 Claims, 13 Drawing Sheets

U.S. PATENT DOCUMENTS

| | | | |
|---|---|---|---|
| 5,094,360 A | 3/1992 | Lange | 220/485 |
| 5,200,072 A | 4/1993 | Frejborg et al. | |
| 5,221,437 A | 6/1993 | Sieron et al. | 162/232 |
| 5,255,790 A * | 10/1993 | Einoder et al. | 209/393 |
| 5,285,560 A | 2/1994 | Gero et al. | |
| 5,387,340 A | 2/1995 | Ackerman | |
| 5,394,600 A | 3/1995 | Chen | |
| 5,503,323 A | 4/1996 | Bergkvist et al. | |
| 5,504,987 A | 4/1996 | Bergkvist | |
| 5,513,757 A | 5/1996 | Papetti | |
| 5,595,307 A | 1/1997 | Hautala | |
| 5,605,234 A | 2/1997 | Aikawa | 209/411 |
| 5,647,128 A | 7/1997 | Aikawa | 29/896.62 |
| 5,718,826 A | 2/1998 | Frejborg | |
| 5,788,860 A | 8/1998 | Yasue et al. | |
| 5,791,495 A | 8/1998 | Gero et al. | 209/395 |
| 5,798,025 A | 8/1998 | Iwashige | 162/261 |
| 5,799,798 A | 9/1998 | Chen | 209/306 |
| 5,804,075 A | 9/1998 | Aikawa | 210/497.01 |
| 5,954,956 A | 9/1999 | Lutz et al. | |
| 5,968,357 A | 10/1999 | Doelle et al. | |
| 6,047,834 A | 4/2000 | Dolle et al. | |
| 6,051,103 A | 4/2000 | Aikawa | 162/55 |
| 6,056,126 A | 5/2000 | Schabel et al. | |
| 6,092,286 A | 7/2000 | Lange | |
| 6,131,743 A | 10/2000 | Czerwoniak et al. | 209/406 |
| 6,138,838 A | 10/2000 | Soik et al. | |
| 6,338,412 B1 | 1/2002 | Serres et al. | |
| 6,340,805 B1 | 1/2002 | Ljokkoi | |
| 6,425,486 B1 | 7/2002 | Andersson et al. | |
| 6,426,003 B2 | 7/2002 | May et al. | |
| 6,491,168 B1 | 12/2002 | Lutz et al. | |
| 6,550,620 B2 | 4/2003 | Fukudome et al. | |
| 6,579,458 B2 | 6/2003 | Mickelat et al. | |
| 6,589,424 B1 | 7/2003 | Nieminen | |
| 6,649,068 B2 | 11/2003 | Phillips | |
| 6,708,829 B2 | 3/2004 | Robertson et al. | |
| 6,745,469 B1 | 6/2004 | Soik et al. | |
| 6,785,964 B2 | 9/2004 | Raphael | |
| 6,789,681 B2 | 9/2004 | Czerwoniak et al. | 209/405 |
| 6,915,910 B2 | 7/2005 | Lutz et al. | |
| 7,125,491 B2 | 10/2006 | Gabl et al. | |
| 7,188,733 B2 | 3/2007 | May et al. | |
| RE39,940 E | 12/2007 | Frejborg et al. | |
| 7,374,050 B2 | 5/2008 | Grace et al. | |
| 7,506,767 B2 | 3/2009 | Laakso | |
| 2002/0130075 A1 | 9/2002 | May et al. | |
| 2003/0226801 A1 | 12/2003 | Gassmann et al. | |
| 2004/0099583 A1 | 5/2004 | Frejborg | |
| 2004/0149633 A1 | 8/2004 | Fredriksson | 209/411 |
| 2007/0074998 A1 | 4/2007 | Langener | |
| 2007/0114157 A1 | 5/2007 | Fredriksson | |
| 2007/0199362 A1 | 8/2007 | Lange | |
| 2007/0220942 A1 | 9/2007 | Lange | |
| 2007/0221544 A1 | 9/2007 | Chen | |
| 2009/0020461 A1 * | 1/2009 | Hetu | 209/406 |

FOREIGN PATENT DOCUMENTS

| | | |
|---|---|---|
| DE | 39 42 591 A1 | 6/1991 |
| DE | 42 24 727 A1 | 2/1994 |
| DE | 100052715 A1 | 2/2002 |
| EP | 0182688 A1 | 5/1986 |
| EP | 0206975 A2 | 12/1986 |
| EP | 0294832 A2 | 12/1988 |
| EP | 0316570 A2 | 5/1989 |
| EP | 0707 109 A1 | 4/1996 |
| EP | 0 764 737 A1 | 3/1997 |
| EP | 0 814 194 A1 | 12/1997 |
| EP | 0 926 295 A1 | 6/1999 |
| EP | 0982 433 A2 | 3/2000 |
| EP | 1 273 696 A1 | 1/2003 |
| GB | 2033242 | 5/1980 |
| JP | 2001 003289 A | 1/2001 |
| JP | 2001347108 A | 12/2001 |
| JP | 2007-224488 A | 9/2007 |
| JP | 2007224489 A | 9/2007 |
| WO | WO 90/12147 | 10/1990 |
| WO | WO 91/10009 | 7/1991 |
| WO | WO 96/30587 | 10/1996 |
| WO | WO 97/10380 | 3/1997 |
| WO | WO 97/34045 | 9/1997 |
| WO | WO 98/14658 | 4/1998 |
| WO | WO 00/65151 | 11/2000 |
| WO | WO 00/73579 A1 | 12/2000 |
| WO | WO 02/34357 A1 | 5/2002 |
| WO | WO 02/083263 A1 | 10/2002 |
| WO | WO 2006/008332 A2 | 1/2006 |
| WO | WO 2006/058567 A1 | 6/2006 |
| WO | WO 2006/119614 A1 | 11/2006 |
| WO | WO 2007/051908 A1 | 5/2007 |
| WO | WO 2009/062287 A1 | 5/2009 |

* cited by examiner

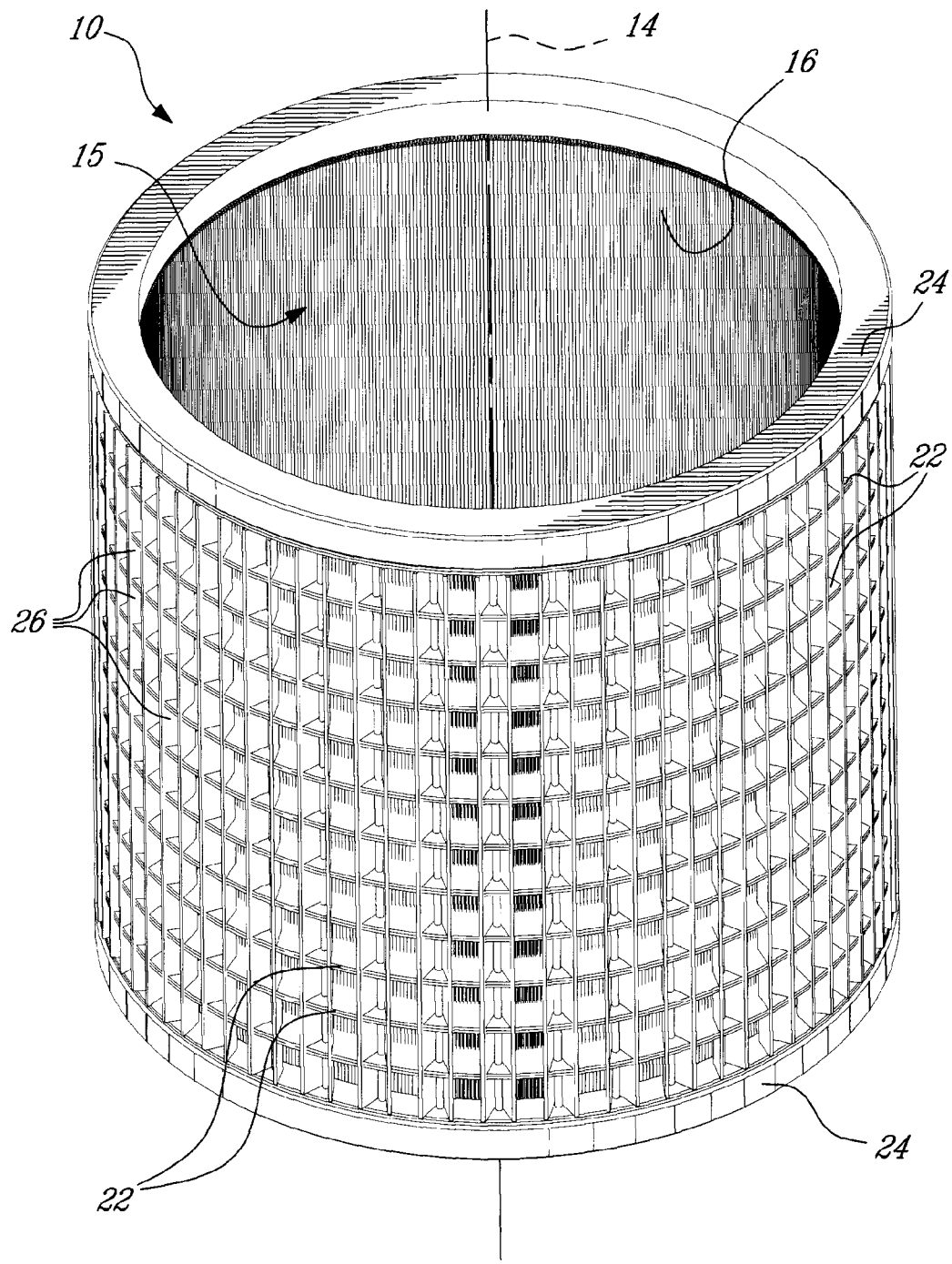

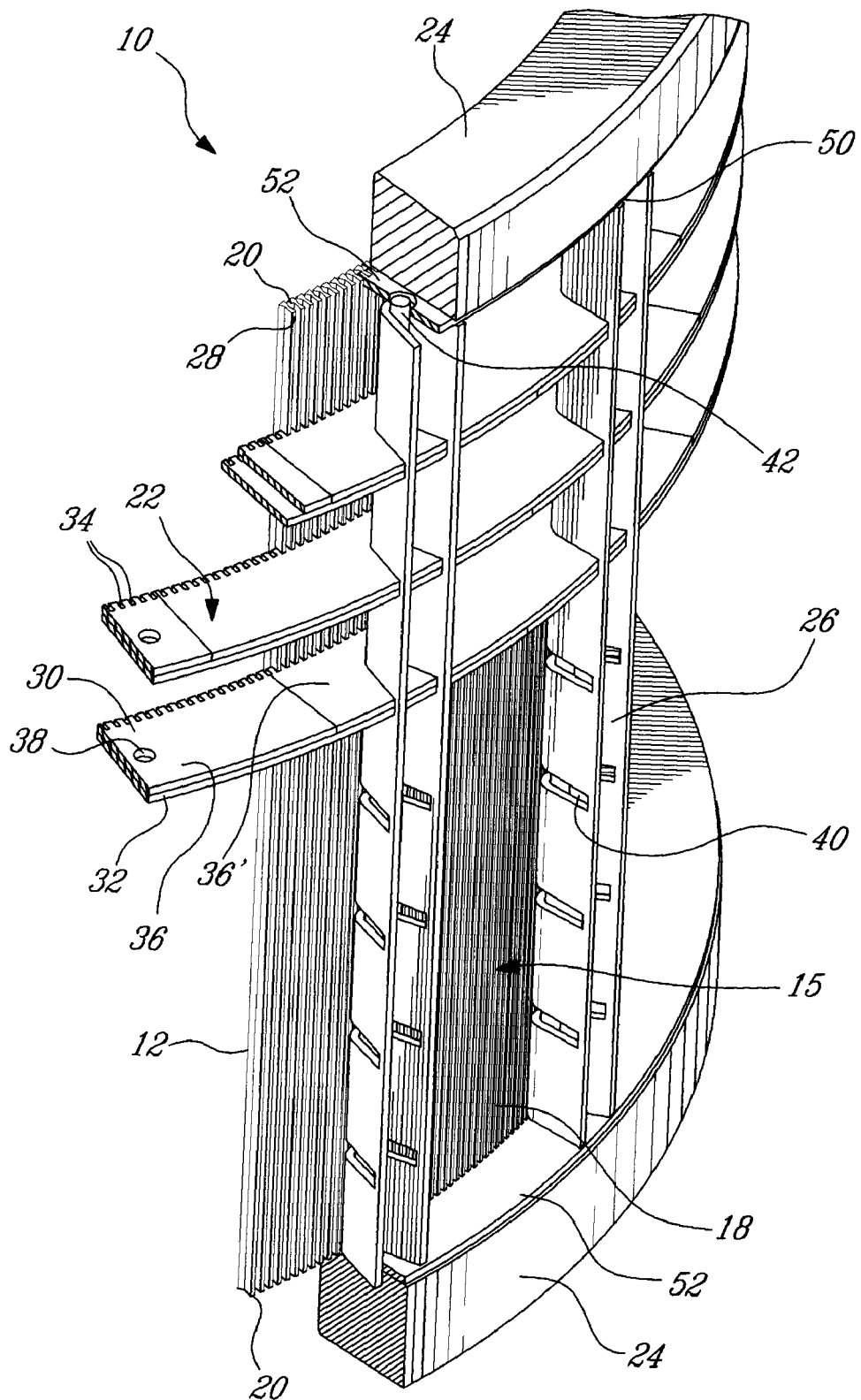

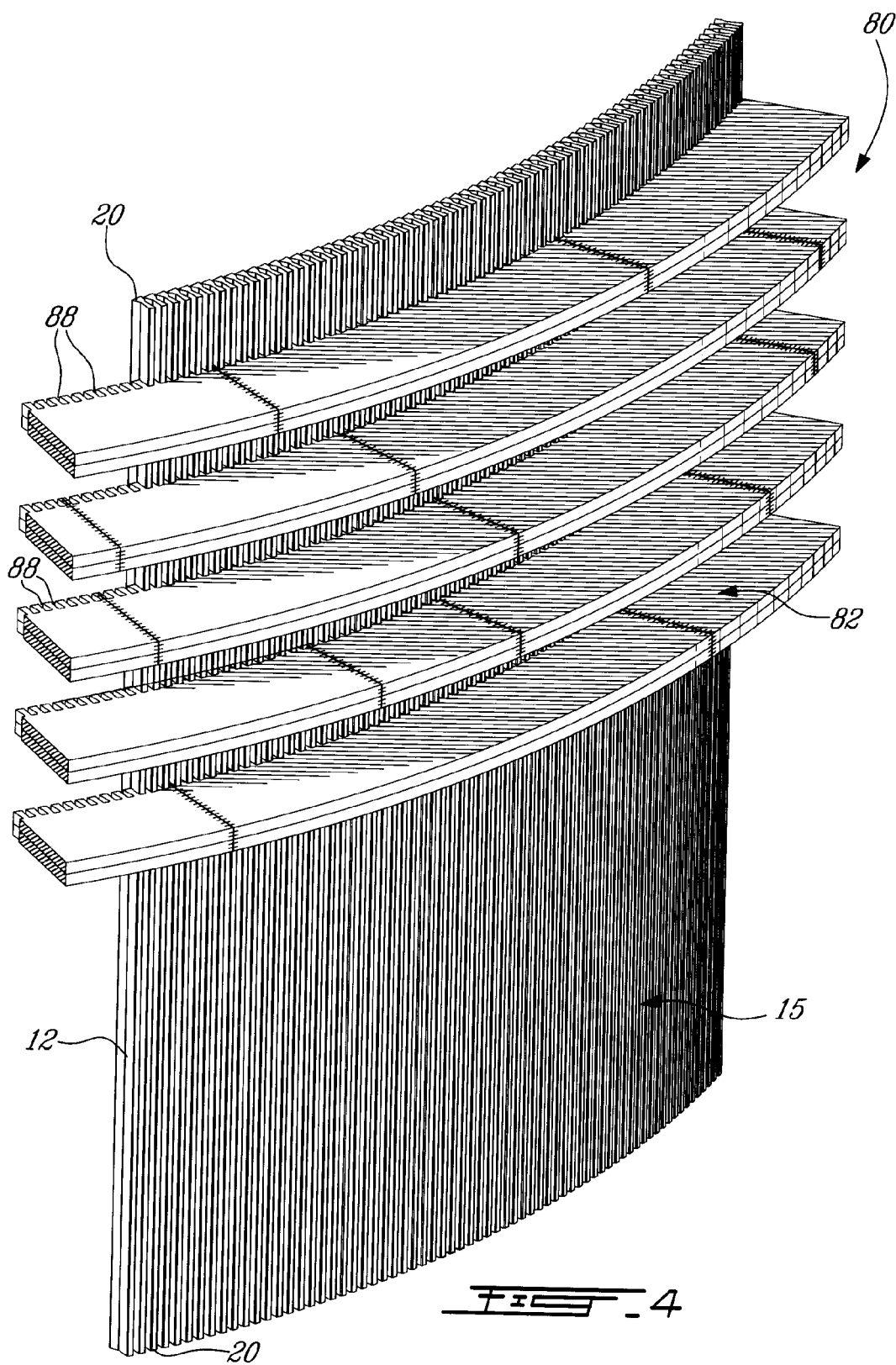

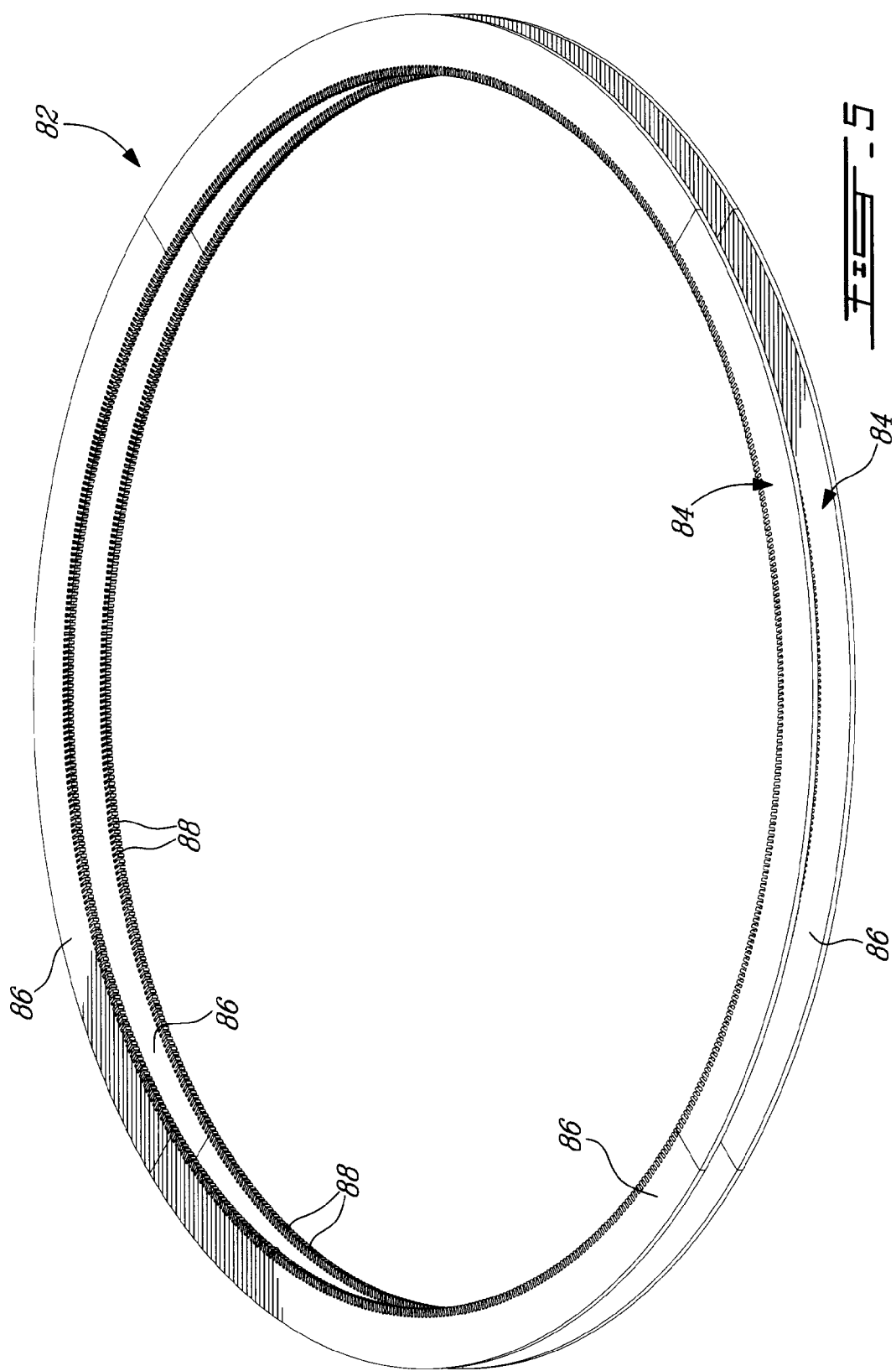

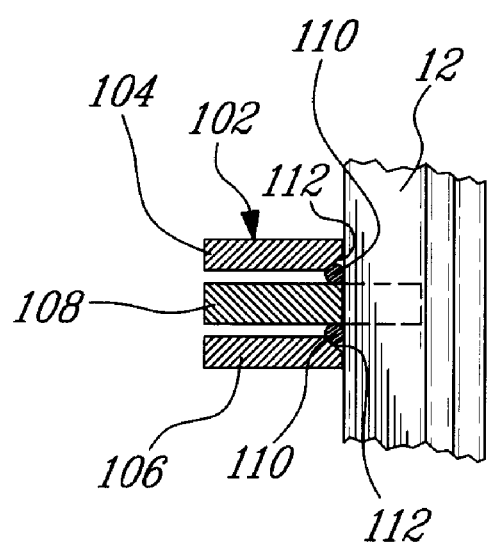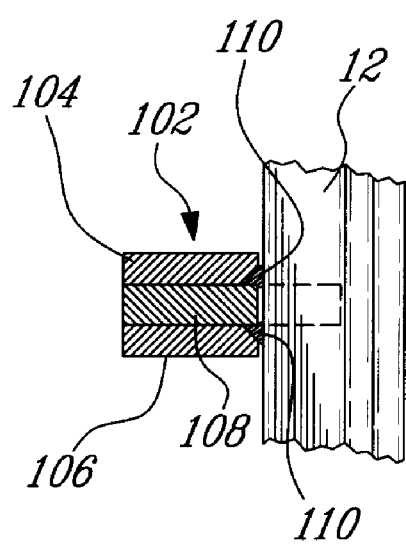

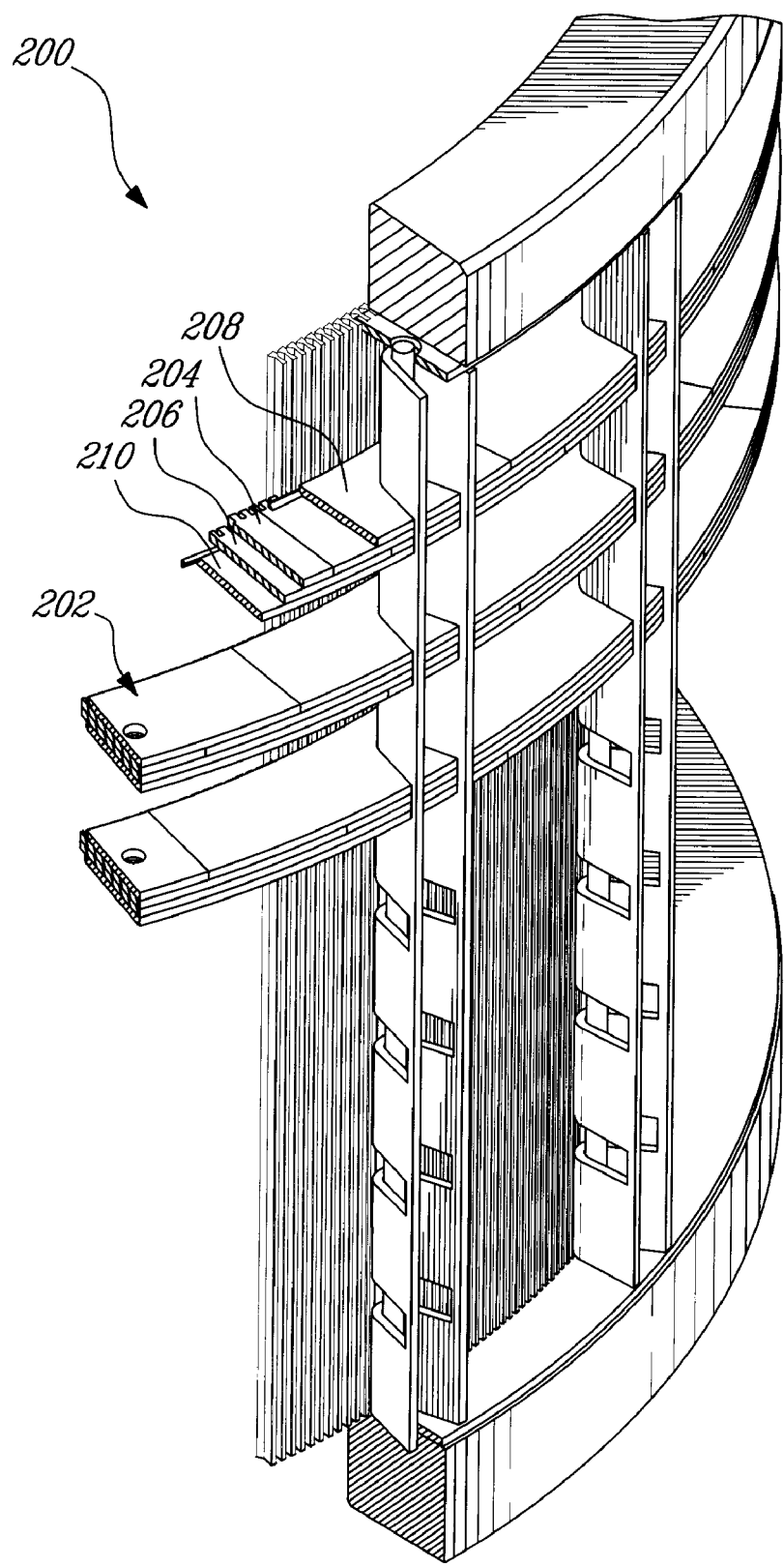

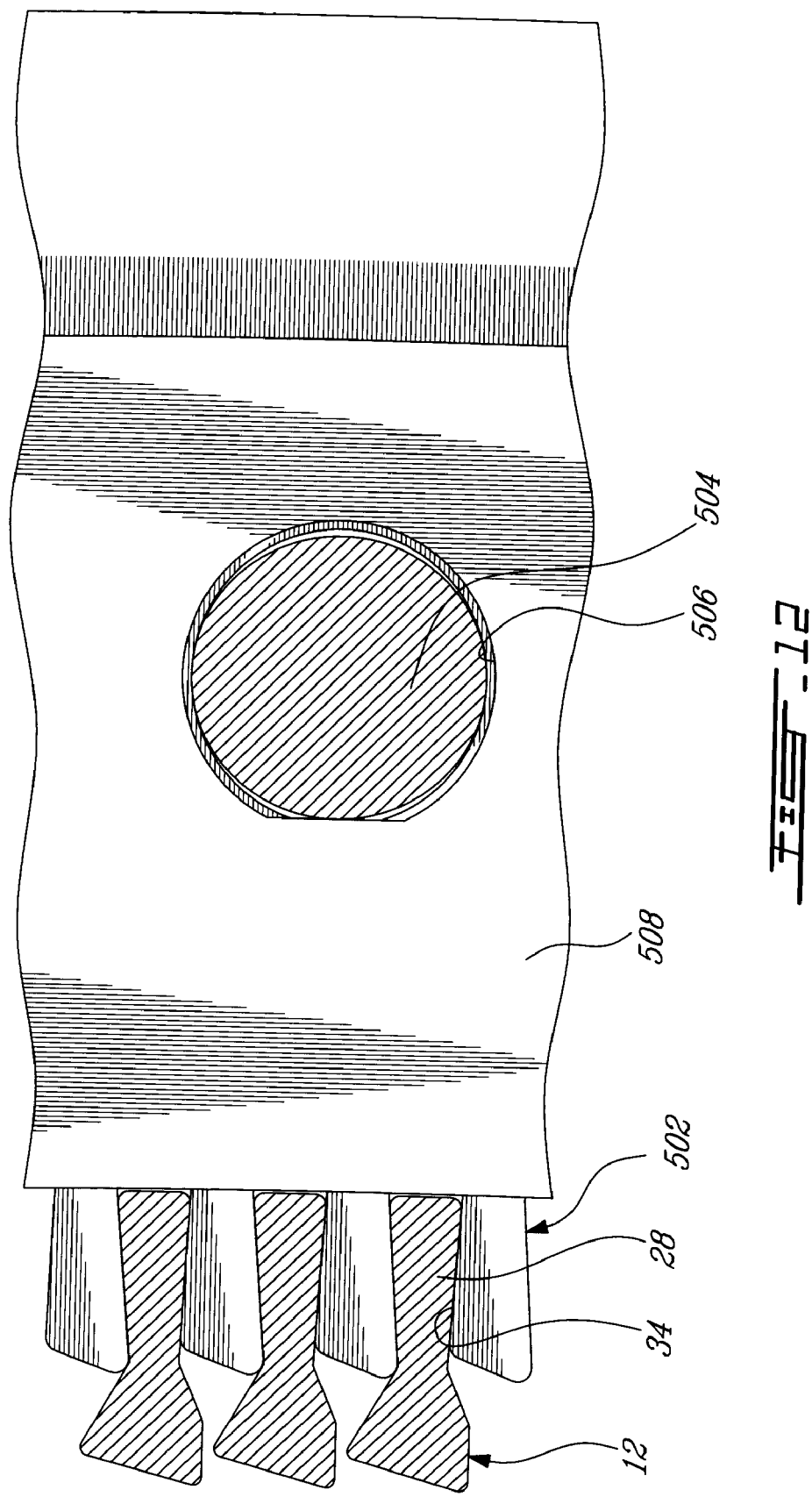

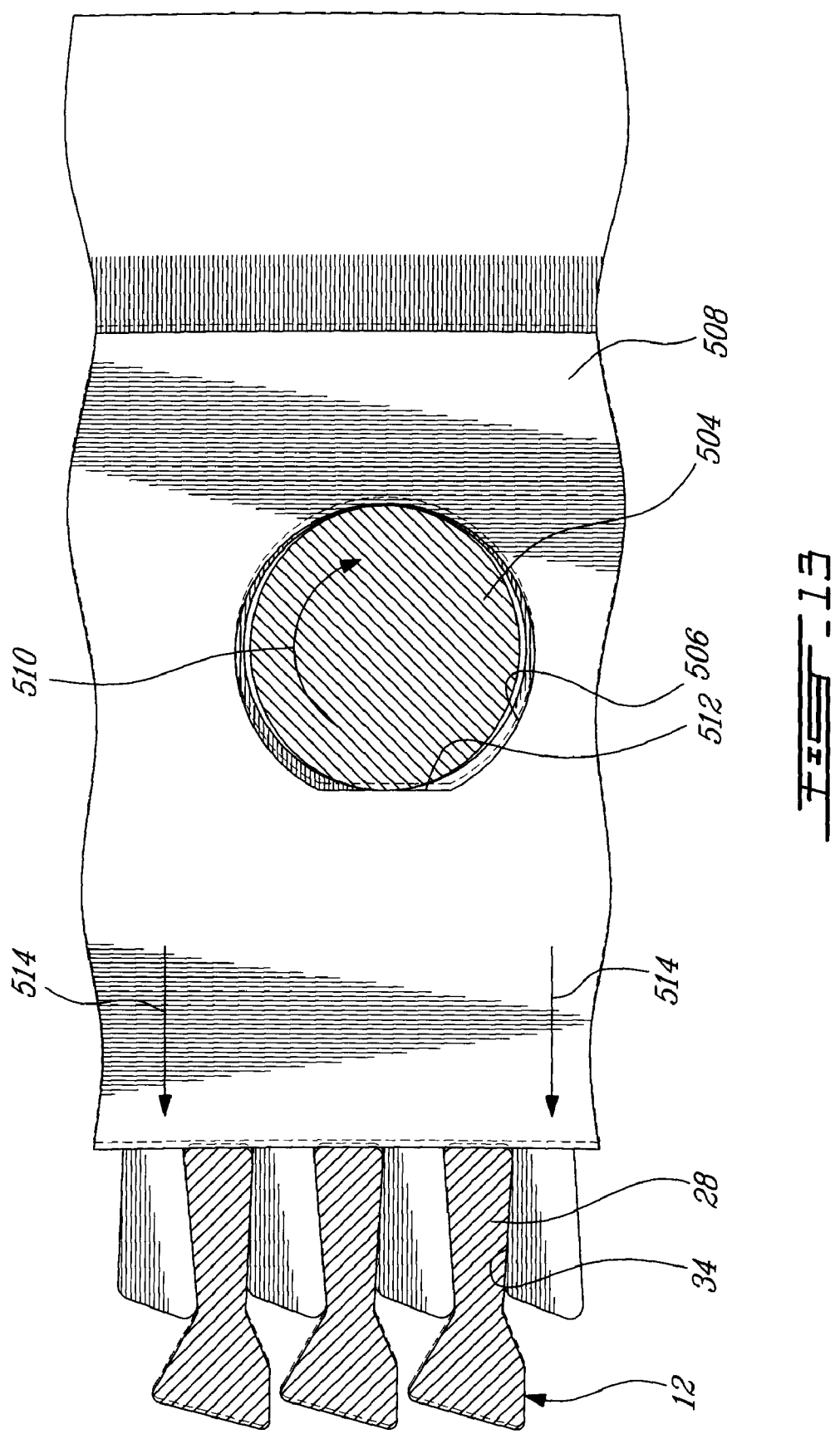

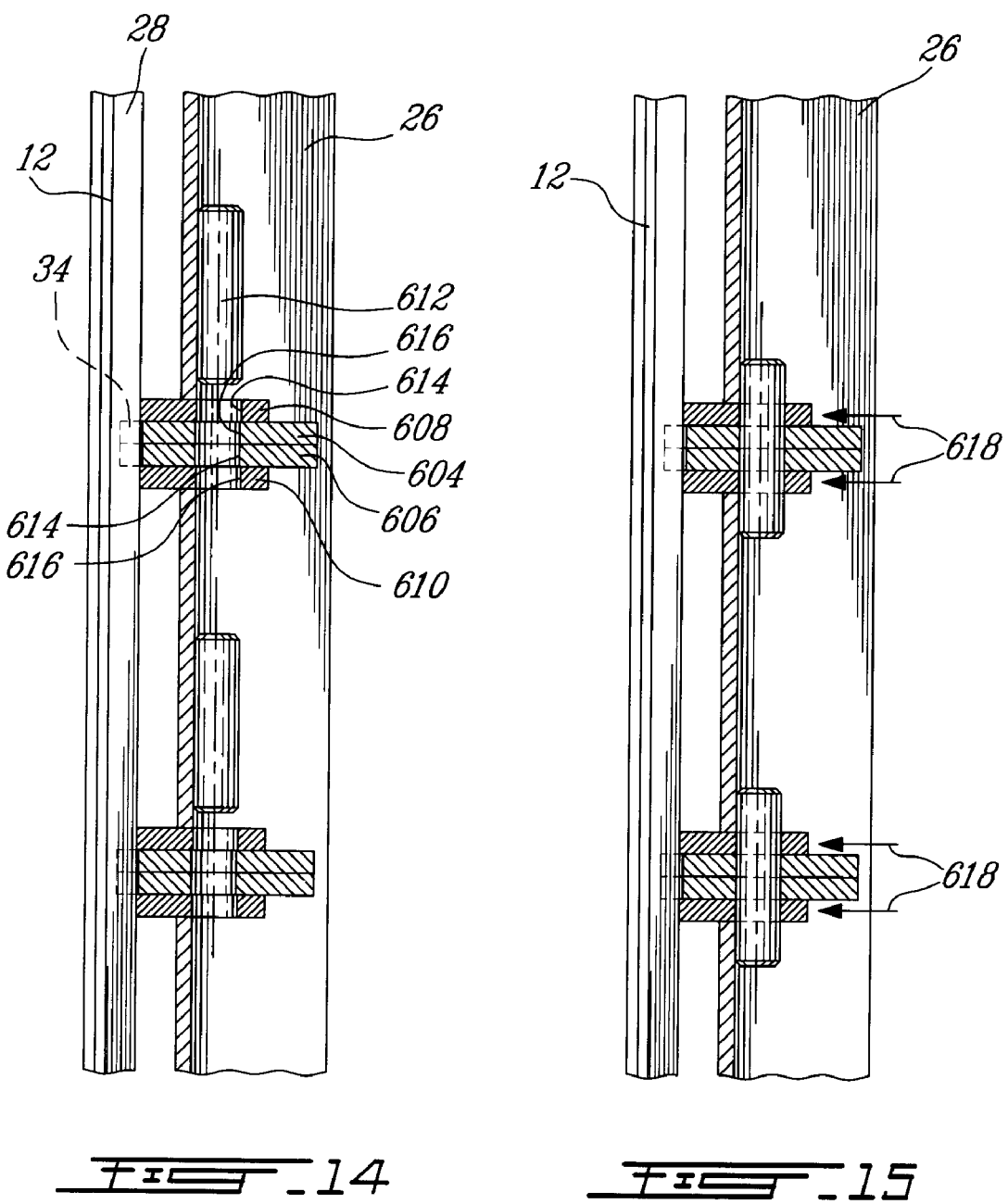

SCREEN BASKET

This is a national stage application under 35 U.S.C. 371, of International Application Number PCT/CA2008/001882, filed on Oct. 24, 2008, which claims priority from U.S. provisional application No. 60/987,818, filed on Nov. 14, 2007.

BACKGROUND

Pulp screening in the pulp and paper industry is generally achieved with pressure screens in which the furnish is pumped to remove oversized contaminants, fiber bundles, wood fragments, and/or sort long and short fibers, and/or stiff and soft fibers. Several pressure screen configurations are in use today. The two main configurations are pressure screens using substantially cylindrical outward flow basket, and screens using substantially cylindrical inward flow basket. The pressure screens generally require the accepted stock to pass through the holes or slots of a screen basket. Rejects too large to pass through the screen basket or wedge-wire basket openings leave through a rejects outlet. A rotor is used to prevent the slots or holes from plugging. The rotor creates pressure pulsations resulting in sufficient cleaning action of the screening surface to avoid plugging condition.

In applications with aggressive rotor, screen baskets are subjected to high dynamic loading from the pressure pulsations generated by the rotor. In such applications, ring fatigue failure of wedge wire basket is commonly observed and the mills are often forced to get back to milled slot or drilled baskets, resulting in a loss of capacity and/or efficiency for obtaining acceptable screen basket life.

Wedge wire baskets are most commonly welded assemblies. Baskets from these constructions suffer to various degrees from distortion, residual stress, stress concentration from welded joint geometry and weld defects, which can normally be associated with most welding processes.

Among the screen baskets commercially available, the wedge wire baskets offer high open area resulting from their continuous slots extending over the entire basket length. The accuracy of the cold drawing process used in wire manufacturing can be used to achieve accurate slot width and repeatable contour geometry, which contribute in providing better efficiency and capacity than milled slot or drilled baskets.

Conventional wedge wire screen baskets generally comprise a plurality of wedge wires (profiled bars) that are permanently joined to support rings by various methods. It should be understood by the term "permanently joined" that a destructive method, such as cutting, grinding, chemical attack, etc., would be required to remove the profiled bars from the support rings. Support rings are used to withstand the loading to which the basket is subjected during screening. For severe applications, the screen basket are often reinforced using additional welded or shrink fit rings or backing jacket.

Some efforts have been made by manufacturers to re-use a portion of the main structure by using replaceable screening elements. However, the manufacturing of these elements is costly and requires several steps and more material at each rebuild. Also, loss in open area is sometimes generated because of the fixing devices such as cage or backing jacket. Finally, the slot and contour accuracy and uniformity are also compromised because of the assembly method.

BRIEF DESCRIPTION OF THE DRAWINGS

In the appended drawings:

FIG. 1 is a perspective view of a demountable screen basket according to a first embodiment;

FIG. 2 is a perspective partly sectional view of FIG. 1;

FIG. 4 is a perspective partly sectional view of a screen basket according to a fourth embodiment;

FIG. 5 is an exploded view of the ring assembly from FIG. 4;

FIG. 7 is an isolated radial cross-sections of the assembly of a profiled bar and a support ring assembly of the screen basket of FIG. 6, illustrating the compressible inserts before being compressed;

FIG. 8 is an isolated radial cross-sections of the assembly of a profiled bar and a support ring assembly of the screen basket of FIG. 6, illustrating the compressible inserts compressed;

FIG. 9 is a perspective partly sectional view of a screen basket according to a sixth embodiment;

FIG. 12 is a sectional top plan view of a mounting mechanism used to mount the profiled bars to the support ring assembly; the mounting mechanism being illustrating in a non tensioning position;

FIG. 13 is a sectional top plan view of the mounting mechanism of FIG. 12 illustrated in a tensioning position;

FIG. 14 is a sectional side elevational view of an alternative mounting mechanism used to mount the profiled bars to the support ring assembly; the mounting mechanism being illustrating in a non tensioning position; and FIG. 15 is a sectional side elevational view of the alternative mounting mechanism of FIG. 14 illustrated in a tensioning position.

DETAILED DESCRIPTION

Figure 3A:
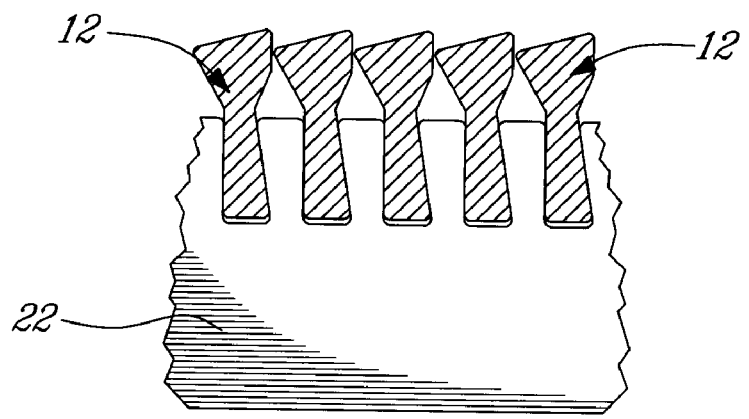
FIGS. 3A to 3C are top-plan cross-sections illustrating back contours for the locking portions and for the corresponding complementary grooves of the support ring assemblies of screen baskets according to first, second and third embodiments.

Generally stated, according to illustrative embodiments, there is provided a screen basket including profiled bars evenly spaced circumferentially to form a plurality of continuous slots that covers the whole basket length. The profiled bars are fixed in place by support rings which formed a backing structure for the profiled bars. The support rings and/or the groove disk(s) are made of at least two sections.

In the following description, similar features in the drawings have been given similar reference numerals, and in order not to weigh down the figures, some elements are not referred to in some figures if they were already identified in a precedent figure.

Turning now to FIGS. 1-2 of the appended drawings, a screen basket 10 according to a first embodiment will be described.

The demountable screen basket 10 comprises a plurality of profiled bars 12 aligned along a longitudinal axis 14 and positioned so as to define a slotted cylindrical wall 15 having an inner side 16, defining a screening surface, and an outer side 18. The profiled bars 12 extend between two longitudinal ends 20. The basket 10 also includes a plurality of support ring assemblies 22 mounted to the plurality of profiled bars 12, transversally therefrom, for assembling the plurality of profiled bars 12 into the slotted cylindrical wall 15, a pair of annular end flanges 24, and a plurality of clamping posts 26 for positioning and contributing to securing the support ring assemblies 22.

As can be better seen from FIG. 2, each profiled bar 12 has a dovetail portion 28 configured to be mounted to the support ring assemblies 22 as will be described hereinbelow.

Each support ring assembly 22 includes a top sectional support ring 30 and a bottom sectional support ring 32. Both support rings 30 and 32 are provided with identical equidistanced grooves 34 complementary to the dovetail portion 28 of the profiled bars 12. Accordingly, the profiled bars 12 are prevented from being released radially. Each profiled bar 12 is however slidable along the support ring assemblies 22 and therefore removably mounted thereto. Indeed, to ease the mounting of the profiled bars 12 into the grooves 34, the dovetail portions 28 and grooves 34 are so dimensioned as to yield a clearance therebetween.

The grooves 34 are located on the inner side diameter of the rings 30 and 32 for outward flow screen basket configuration, such as screen basket 10. For inward flow screen basket configuration (not illustrated), the grooves 34 are located on the outer side diameter of the rings 30 and 32 and the clamping posts 26 are positioned on the inner side of the basket.

It should be noted that the rings 30 and 32 are manufactured before assembly and already include the assembly grooves 34.

As mentioned hereinabove, the top and bottom rings 30 and 32 are sectional. In other words, each ring 30 and 32 is made of at least two ring sections 36, 36'. Of course, the number of ring sections may vary.

The rings 30 and 32 are assembled so that their respective sections 36-36' are not aligned or equally numbered and of the same arc length. Welding, glue or fasteners can then be used to assemble the sections 36 or 36'.

To press the stack of support rings 30, 32, each pair of rings are clamped together for example at equally spaced circumferential locations by the clamping posts 26. The clamping posts 26 are in the form of combs provided with longitudinal notches 40 for receiving the pair of rings 30-32.

Even though the clamping combs 26 are illustrated as V or U-shaped elongated members, they can also be tubular for example. The clamping combs 26 can further be in the form of elongated beam-like members provided with V-shaped brackets (not shown) mounted thereon for receiving the support ring assemblies 22.

The notches 40 are distributed to locate the support ring assemblies 22 at desired locations along the basket length with uniform or variable spacing, to have for example tighter ring pair spacing in a more critical region of the basket 10.

More specifically, the support ring assemblies 22 are provided with respective co-axial holes 38 receiving the rods 42.

Still referring to FIG. 2, the basket 10 also includes end rings 52 that are mounted at each of the longitudinal end of the clamping combs 26 so as to abut the flanges 24. Each end ring 52 is a grooved ring contacting the combs 26

The rods 42 are inserted into holes 38 in the top and bottom rings 52.

The bottom rings 52 also include fastener's holes (not shown) to allow a threaded fastener to enter a threaded aperture (not shown) of the flange 24.

Also, the clamping combs 26 can alternatively be positioned so as to show an angle with both the support ring assemblies 22 and the profiled bars 12 and are thus not limited to the position aligned with the profiled bars 12 illustrated for example in FIGS. 1-2.

Even though the basket 10 is illustrated with equally distanced clamping combs 26, it can be provided with unequally spaced clamping combs 26.

Also, the number of profiled bars 12, support ring assemblies 22, and clamping combs 26 may vary.

Furthermore, even though the screen basket 10 has been described as a screen suitable for outward flow, it is believed to be within the reach of a person skilled in the art to adapt the present teaching for an inward flow application. For example, in such a case, the support ring assemblies 22, the end rings 52 and the clamping combs 26 are positioned on the inner side of the cylinder formed by the profiled bars 12, with the profiled portions thereof located on the outside of the cylinder.

It is also to be noted that the clamping combs 26 could be replaced by spacer blocks (not shown), that would be used to determine the axial separation between the support ring assemblies 22.

As will be illustrated hereinbelow, other securing means than the clamping combs 26 can also be used to assemble the profiled bars 12 to the rings 30 and 32 including without limitation welding and gluing.

Even though the basket 10 has been described equipped with profiled bars 12 having a dovetail portion configured to be mounted to the support ring assemblies 22 (see FIG. 3A for example), it is not limited to such shape.

Figure 3B:
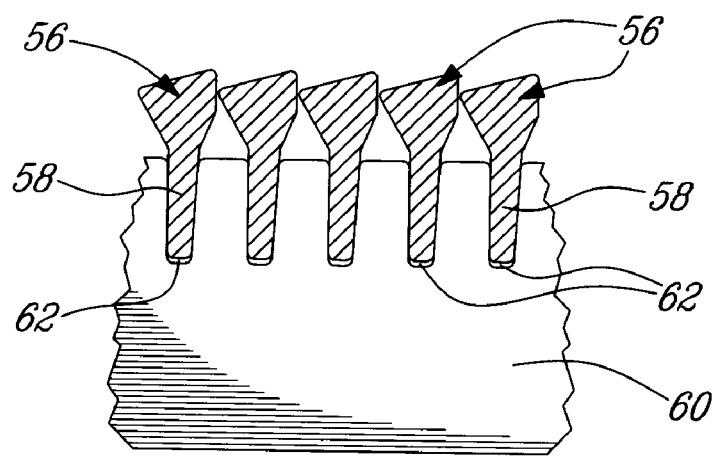

For example, FIG. 3B illustrates profiled bars 56 according to a second embodiment including locking portions 58 having a tapered shape. The support rings 60 have a complementary portion 62 which allows easy insertion of the locking portion therein.

Figure 3C:
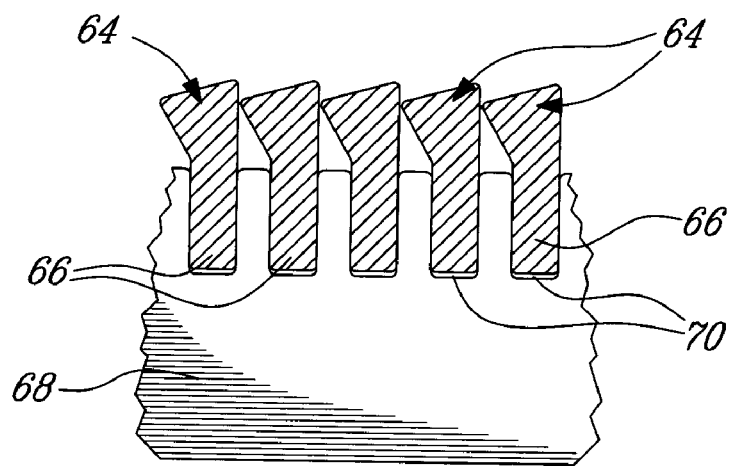

FIG. 3C illustrates profiled bars 64 according to a third embodiment, including straight mounting portions 66. The support rings 68 according to this third illustrative embodiment have a complementary rectangular-shaped receiving portion 70. According to this third embodiment, the profiled bars 64 and support rings 68 are further assembled using glue, welding, brazing or other equivalent methods.

Turning now to FIG. 4 a screen basket 80 according to a fourth embodiment will now be described. Since the screen basket 80 is similar to the screen basket 10, and for concision purposes, only the differences between the two screen baskets will be described herein.

The screen basket 80 comprises a plurality of profiled bars 12 positioned so as to define a slotted cylindrical wall 15. The profiled bars 12 extend between two longitudinal ends 20. The basket 80 also includes a plurality of support ring assemblies 82 mounted to the plurality of profiled bars 12, transversally therefrom, for assembling the plurality of profiled bars 12 into the slotted cylindrical wall 15.

Turning now briefly to FIG. 5, each support ring assembly 82 includes a pair of sectional rings 84. Each of the sectional rings 84 is assembled from a plurality of ring sections 86 (four illustrated for each ring 84). The ring sections 86 may have the same arc length, for example to simplify the manufacturing process of the support ring 84. Of course, the number of ring sections may vary.

The support rings 84 are provided with identical equidistanced grooves 88 complementary to the dovetail portion 28 of the profiled bars 12.

It should be noted that the rings 84 are manufactured before assembly and already include the assembly grooves 88. According to this fourth embodiment, the ring sections 86 are permanently secured end-to-end using glue or welding. According to further embodiments (not shown), the ring sections 86 are assembled using fasteners. A combination of fastening methods can also be used.

The plurality of profiled bars 12 are also permanently secured to the support rings 84 using glue, welding or brazing, no other securing means being used to assemble the basket 80. However, as a person skilled in the art would now appreciate, each ring assembly 82 needs not to be secured to each profiled bar 12 to yield a basket 80 having sufficient rigidity in most applications.

Contrarily to the ring sections 36 and 36' of the ring assembly 22 according to the first illustrative embodiment, the two rings 84 can be assembled so that their respective sections 86 are aligned. Moreover, when the rings 84 are secured for example by welding to the profiled bars 12, a single ring 84 per ring assembly 82 can be used.

Figure 6:
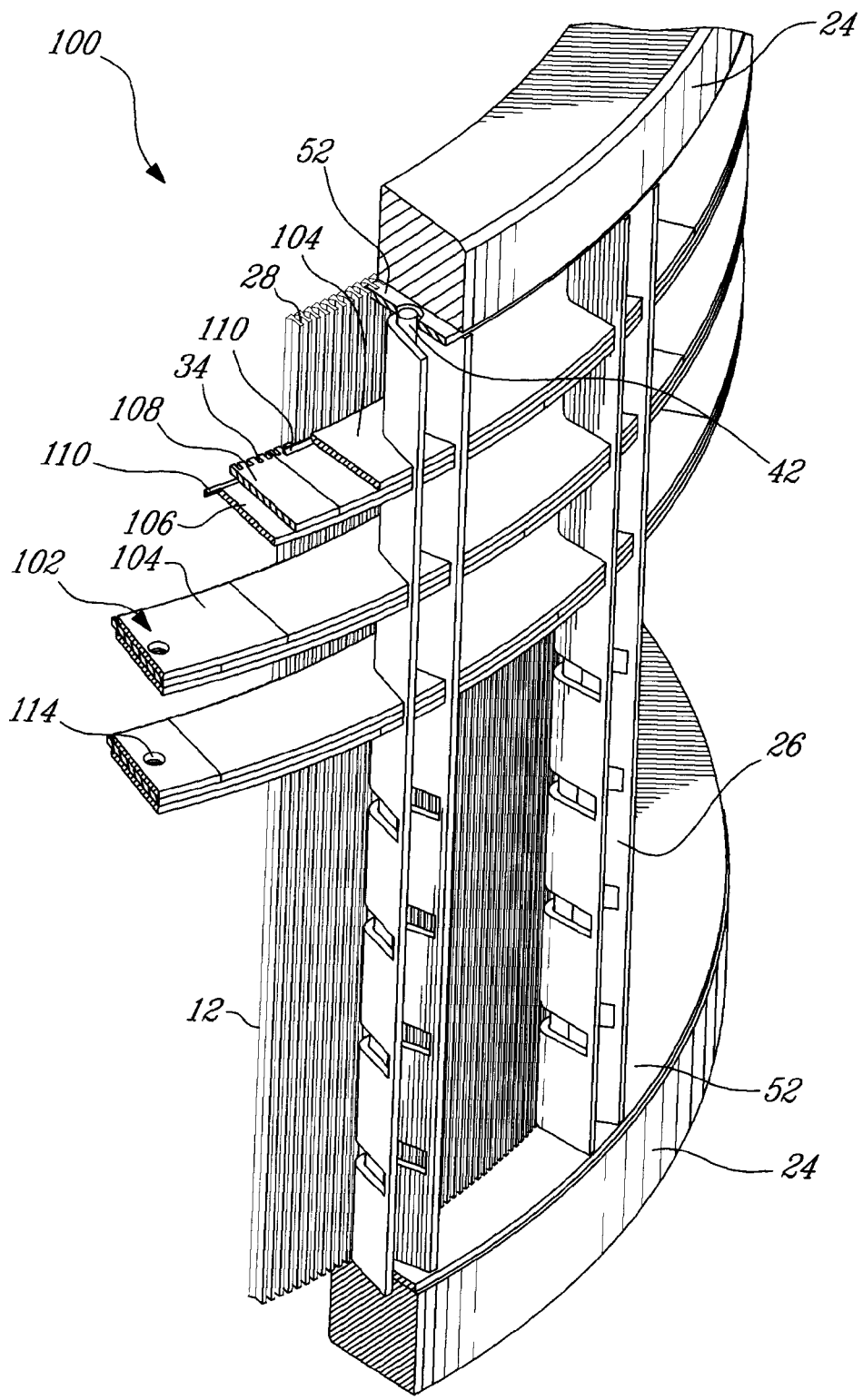
FIG. 6 is a perspective partly sectional view of a screen basket according to a fifth embodiment.

Turning now to FIGS. 6 to 8 of the appended drawings, a basket 100 according to a fifth embodiment will be described. Since the screen basket 100 is very similar to the screen basket 10, and for concision purposes, only the differences between the baskets 10 and 100 will be described in more detail hereinbelow.

Generally stated, the main difference between the two baskets 10 and 100 is the support ring assemblies 102 of the screen basket 100 which differ from the support ring assemblies 22 of the screen basket 10. The means for securing the support ring assemblies 102 also differ.

Each support ring assembly 102 includes top and bottom sectional rings 104, 106 which extend along the periphery of the basket 100. The top and bottom sectional rings 104 and 106 are each made of at least two angular segments. The support ring assembly 102 also includes an intermediate sectional grooved disk 108, which is made of at least two angular segments, mounted between the top and bottom sectional rings 104 and 106. The intermediate sectional groove disk 108 is similar to the groove disks 30 and 32 of FIG. 2.

The grooved disk 108 includes grooves 34 for complementary receiving the dovetail portions 28 of the profiled bars 12 as discussed hereinbelow in more detail.

The support ring assembly 102 further comprises two compressible inserts in the form of rings 110 positioned between a respective support ring 104, 106 and the grooved disk 108 adjacent to the profiled bars 12. The inner side of each support ring 104, 106 is provided with a chamfer 112 for biasing the inserts 110 towards profiled bars 12 when the support ring assembly 102 is compressed as illustrated in FIG. 5. Also, as illustrated in FIG. 5, the support ring assembly 102 allows forcing the dovetail portion of the bars 12 towards the grooves 34, providing a locking effect. This locking effect is discussed in a PCT patent application no. WO 2006/119614, published on Nov. 16, 2006 and entitled Screen Basket with Replaceable Profiled Bars.

It has been found that any elastomeric material having a Young's modulus lower than about 20 GPa is suitable to be used as the inserts 110.

Of course, the support rings 104, 106 and the intermediate grooved disk 108 are provided with holes 114 to allow the rods 42 therethrough. To provide better stability, the holes 114 are positioned so that each section of the support rings 104, 106 and of the intermediate groove disk 108 include at least one such hole 114 and therefore receives at least one rod 42. It is to be noted that the joints of the two support rings 104, 106 and of the intermediate groove disk 108 forming one support ring assembly 102 are offset to improve the structural integrity of the support ring assembly 102.

The number of sections forming the segmented support rings 104 and 106 and the segmented grooved disk 108 may of course vary. Typically, six angular segments are used for each element.

Turning now to FIG. 9 of the appended drawings, a screen basket 200 according to a sixth embodiment will now be described. For concision purpose, and since the screen basket 200 is similar to the screen basket 100 described hereinabove, only the differences between these screen baskets will be described hereinbelow.

Generally stated, the main difference between the screen basket 200 and the screen basket 100 concerns the support ring assembly 202. This assembly 202 includes two segmented intermediate groove disks 204 and 206 sandwiched between two segmented support disks 208 and 210.

The other features and the operation of the screen basket 200 are similar to the screen basket 100.

Figure 10:
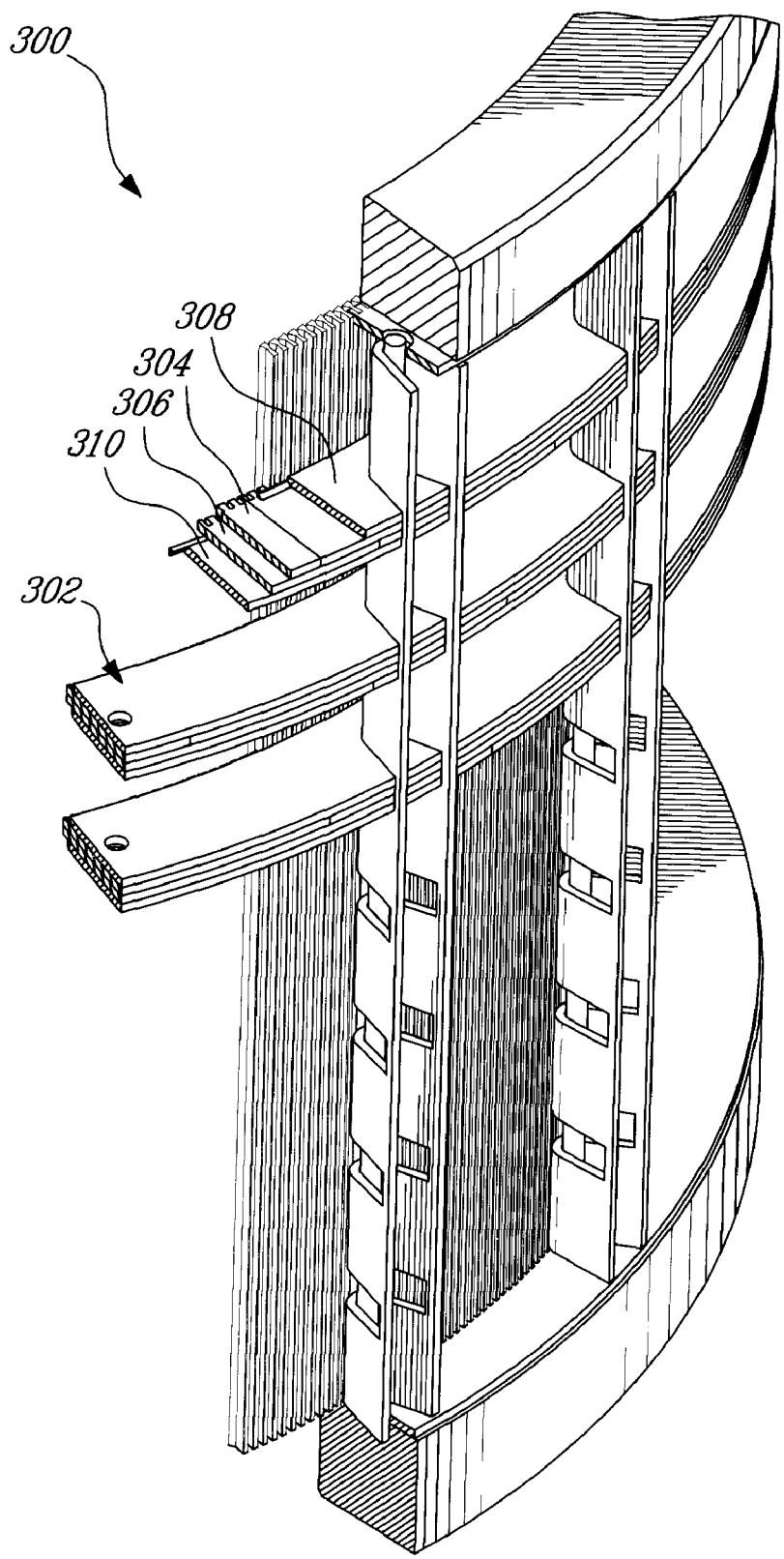
FIG. 10 is a perspective partly sectional view of a screen basket according to an seventh embodiment.

Turning now to FIG. 10 of the appended drawings, a screen basket 300 according to a seventh embodiment will be described. For concision purpose, and since the screen basket 300 is similar to the screen baskets 100 and 200 described hereinabove, only the differences between these screen baskets will be described hereinbelow.

Generally stated, the main difference between the screen basket 300 and the screen basket 200 concerns the support ring assembly 302. This assembly 302 includes two segmented intermediate groove disks 304 and 306 sandwiched between a segmented bottom support disk 308 and a non-segmented top support disk 310.

Of course, one skilled in the art will understand that, in a non-illustrated embodiment, the bottom support disk could be non-segmented and the top support disk could be segmented.

The other features and the operation of the screen basket 300 are similar to the screen basket 100.

Figure 11:
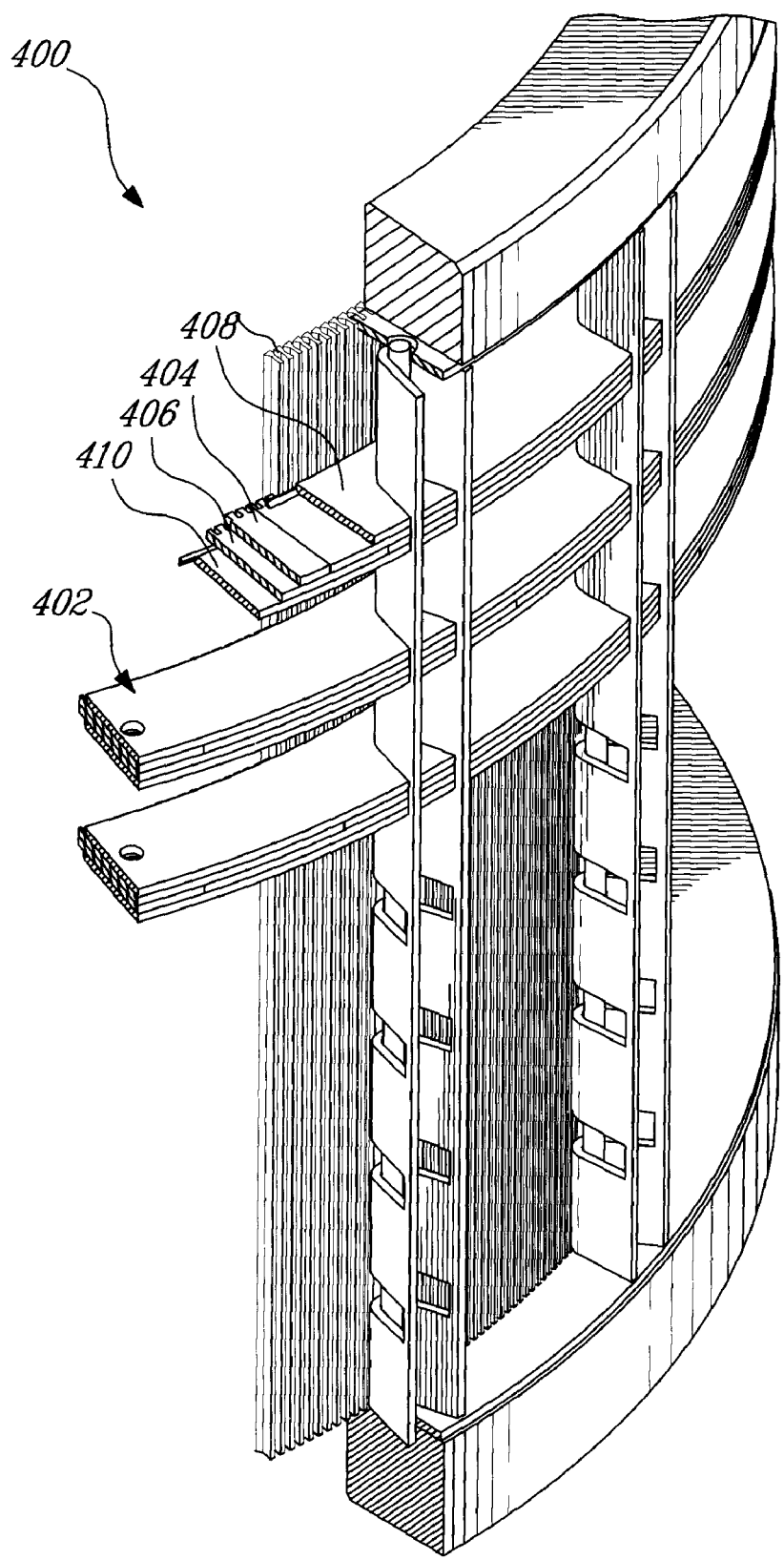
FIG. 11 is a perspective partly sectional view of a screen basket according to an eight embodiment.

Turning now to FIG. 11 of the appended drawings, a screen basket 400 according to an eight embodiment will be described. For concision purpose, and since the screen basket 400 is similar to the screen baskets 100, 200 and 300 described hereinabove, only the differences between these screen baskets will be described hereinbelow.

Generally stated, the main difference between the screen basket 400 and the screen basket 300 concerns the support ring assembly 402. This assembly 402 includes two segmented intermediate groove disks 404 and 406 sandwiched between two non-segmented support disks 408 and 410.

The other features and the operation of the screen basket 400 are similar to the screen basket 100.

Turning now to FIGS. 12 and 13 of the appended drawings, a method and mechanism to releasably mount the profiled bars 12 to the clamping combs 26 will be described. It is to be noted that this method and mechanism could be used with any of the embodiments described hereinabove which includes clamping combs 26 or similar mechanisms and with non-illustrated embodiments mixing features of the described embodiments.

Generally stated, the mounting mechanism uses a cam action to maintain the dovetail portion 28 of the profiled bars 12 on the grooves 34 of the grooved disk 502.

Accordingly the mounting rod 504, which corresponds to the mounting rod 42 of FIG. 2, has an oval shape and the apertures 506 of the support disk 508 are generally D-shaped.

FIG. 12 illustrates this assembly in a non-tensioning position. In this position, the greater diameter of the rod 504 is aligned with the flat portion of the hole.

When the rod 504 is rotated (see arrow 510 in FIG. 13), the oval rod 504 contacts the flat portion 512 of the aperture 506 to radially displace the support disk (see arrows 514) and therefore force the contact between the dovetail portions 28 and the shaped grooves 34. Accordingly, the bars 12 are maintained to the support disks 508 while the rod 504 is in the tensioning position illustrated in FIG. 10. It is to be noted that the dashed lines of FIG. 13 illustrate the initial position of the support disk 508 and of the bars 12.

Turning now to FIGS. 14 and 15 of the appended drawings, another method and mechanism to releasably mount the profiled bars 12 to the clamping combs 26 will be described. It is to be noted that this method and mechanism could be used with any of the illustrative embodiments described hereinabove which includes clamping combs 26 or similar mechanisms and with non-illustrated embodiments mixing features of the described embodiments.

Generally stated, the mounting mechanism illustrated in FIGS. 14 and 15 uses a cam action to maintain the dovetail portion 28 of the profiled bars 12 on the grooves 34 of the grooved disk 604 and 606. However, contrary to the cam action of FIGS. 12 and 13 where it is the rod that is not circular, the pins 612 used are circular and are inserted in apertures 614 of the pushing disks 608 and 610 that are not aligned with the apertures 616 of the groove disks 604 and 606.

Accordingly, when the round pins 612 are inserted in the apertures (see FIG. 15) the apertures 614 are forced into alignment with the apertures 616 thereby radially moving the pushing disks 608 and 610 (see arrows 618) to again forcing the contact between the dovetail portions 28 and the shaped grooves 34.

It is to be noted that the pins 612 have a light chamfer to ease their insertion in the apertures 614 and 616. Alternatively, the pins 612 could be tapered (not shown).

According to still a further embodiment, rods or combs or any other equivalent means are used to force the dovetail portions 28 of the profiled bars 12 into the grooves 34 while the sections 36-36' or the rings are assembled using welding, gluing or brazing for example.

The above described screen baskets can be used in a screening apparatus either held fixed or put in constant or intermittent rotation along an axis, or put under constant or intermittent vibration or displacement.

The profiled bars, support ring assemblies and support can be made to conform to any shape or contour and clamping posts so configured and sized as to yield a screening surface which is flat, curved, stepped, conical, etc.

What is claimed is:

1. A screen basket comprising:
a plurality of profiled bars generally aligned along a longitudinal axis so as to define a slotted cylindrical wall having an inner side and an outer side extending between two longitudinal ends; each of the profiled bars having a radial profiled portion and a radial locking portion; and
at least one support ring, each support ring mounted to at least some of the plurality of profiled bars substantially transversally therefrom, for assembling the plurality of profiled bars into the slotted cylindrical wall; each support ring including a plurality of grooves therein; each groove being configured and sized for complementary receipt of the radial locking portion of a respective one of the profiled bars; each screen basket further comprising a moveable insert adjacent the support ring and the radial locking portion of the profiled bars, the moveable insert comprising a disk having an aperture therein, said screen basket further comprising a camming actuator adapted for insertion into said aperture to provide a radially directed camming action on said disk to move said disk radially toward the locking portion of the profiled bars thereby providing a locking force to bias the locking portions of the profiled bars toward the grooves, wherein said camming actuator comprises an oval rod, said disk aperture having a flat edge portion whereby rotation of said rod in said aperture will provide said camming action.

2. The screen basket as recited in claim 1, wherein said camming actuator comprises a pin, whereby insertion of said pin in said aperture will provide said camming action.

3. The screen basket as recited in claim 1, wherein said pin is tapered.

4. The screen basket as recited in claim 1, wherein said at least one support ring comprises a plurality of first support rings and wherein the plurality of first support rings is assembled from a plurality of sections and said at least one support ring comprises a plurality of second support rings, the plurality of second support rings being assembled from a plurality of sections.

5. The screen basket as recited in claim 4, further comprising top and bottom flanges, each mounted to a respective one of the two longitudinal ends of the slotted cylindrical wall; the first and second support rings being secured to the plurality of profiled bars using a plurality of longitudinal rods spaced around the slotted cylindrical wall; the first and second support rings being provided with holes to receive the longitudinal rods.

6. The screen basket as recited in claim 5, further comprising combs, each receiving a respective one of the longitudinal rods, for longitudinally positioning the first and second support rings along the slotted cylindrical wall; the combs being secured to both top and bottom flanges therebetween and including longitudinal notches to receive the first and second support rings.

* * * * *